United States Patent [19]
Dent et al.

[11] Patent Number: 5,652,750
[45] Date of Patent: Jul. 29, 1997

[54] OPTICAL SATELLITE FEEDER LINKS

[75] Inventors: Paul W. Dent, Stehag, Sweden; Amer A. Hassan, Cary, N.C.

[73] Assignee: Ericsson Inc., Research Triangle Park, N.C.

[21] Appl. No.: 519,943

[22] Filed: Aug. 28, 1995

[51] Int. Cl.$^6$ .......................... H04B 10/105; H02J 17/00
[52] U.S. Cl. ...................... 370/326; 342/352; 342/376; 359/109; 455/12.1; 455/427
[58] Field of Search ..................... 370/77, 95.1, 95.3, 370/97, 104.1, 112; 455/7, 12.1, 13.1, 13.3, 13.4, 33.1, 53.1, 54.1, 56.1, 98, 42; 379/59, 60; 342/54, 352, 353, 354, 376; 359/115, 109, 135, 136, 180, 181, 182; 322/2 R

[56] References Cited

U.S. PATENT DOCUMENTS

| | | | |
|---|---|---|---|
| 4,214,807 | 7/1980 | Gfeller et al. | 359/180 |
| 4,703,479 | 10/1987 | Ikeda | 370/104.1 |
| 4,881,078 | 11/1989 | Yamane et al. | 342/155 |
| 4,901,310 | 2/1990 | Ichiyoshi | 370/75 |
| 4,979,170 | 12/1990 | Gilhousen et al. | 370/104.1 |
| 5,260,639 | 11/1993 | De Young et al. | 322/2 R |
| 5,327,572 | 7/1994 | Freeburg | 455/13.1 |
| 5,386,953 | 2/1995 | Stuart | 244/158 R |
| 5,410,728 | 4/1995 | Berfiger et al. | 455/13.1 |

FOREIGN PATENT DOCUMENTS

| | | |
|---|---|---|
| 182601 | 5/1986 | European Pat. Off. . |
| 405372 | 1/1991 | European Pat. Off. . |
| 516039 | 12/1992 | European Pat. Off. . |
| 624008 | 11/1994 | European Pat. Off. . |
| 624008A2 | 11/1994 | European Pat. Off. . |
| WO94/02972 | 2/1994 | WIPO . |
| WO95/19066 | 7/1995 | WIPO . |

OTHER PUBLICATIONS

Schuss et al., "Design of the Iridium Phased Array Antennas," *IEEE Antennas and Propagation Society international Symposium 1993*, vol. 1, pp. 218–221, Jun. 28, 1993.

J.J. Pan, "Microwave Optics for Space and Ground Communications", National Telesystems, 1993 Conference, pp. 1–6.

Landis, "Photovoltaic Receivers For Laser Beamed Power in Space" Photovoltaic Specialities, 1991 22st Conference, pp. 1494–1502.

Shikatani et al., "ETS–VI Experimental Optical Inter-Satellite Communication System," *IEEE International Conference on Communications*, Jun. 11–14, 1989, pp. 1600–1604.

Duchet et al., "Space Power Supply Networks Using Laser Beams," *Space Power*, vol. 11, Nos. 3 & 4, 1992, pp. 241–250.

Conner et al., "Laser Communication Uplinks and Downlinks," *High Data Rate Atmospheric and Space Communications*, Sep. 8–9, 1988, pp. 62–71.

*Primary Examiner*—Hassan Kizou
*Attorney, Agent, or Firm*—Burns, Doane, Swecker & Mathis, L.L.P.

[57] ABSTRACT

A cellular communications satellite system is disclosed which comprises a plurality of ground-based base stations, mobile stations, and at least one orbiting satellite for relaying signals between the base stations and mobile stations. A Plurality of feederlinks are used between the base stations and the satellite for transmitting signals and power from the ground stations to the satellite.

12 Claims, 10 Drawing Sheets

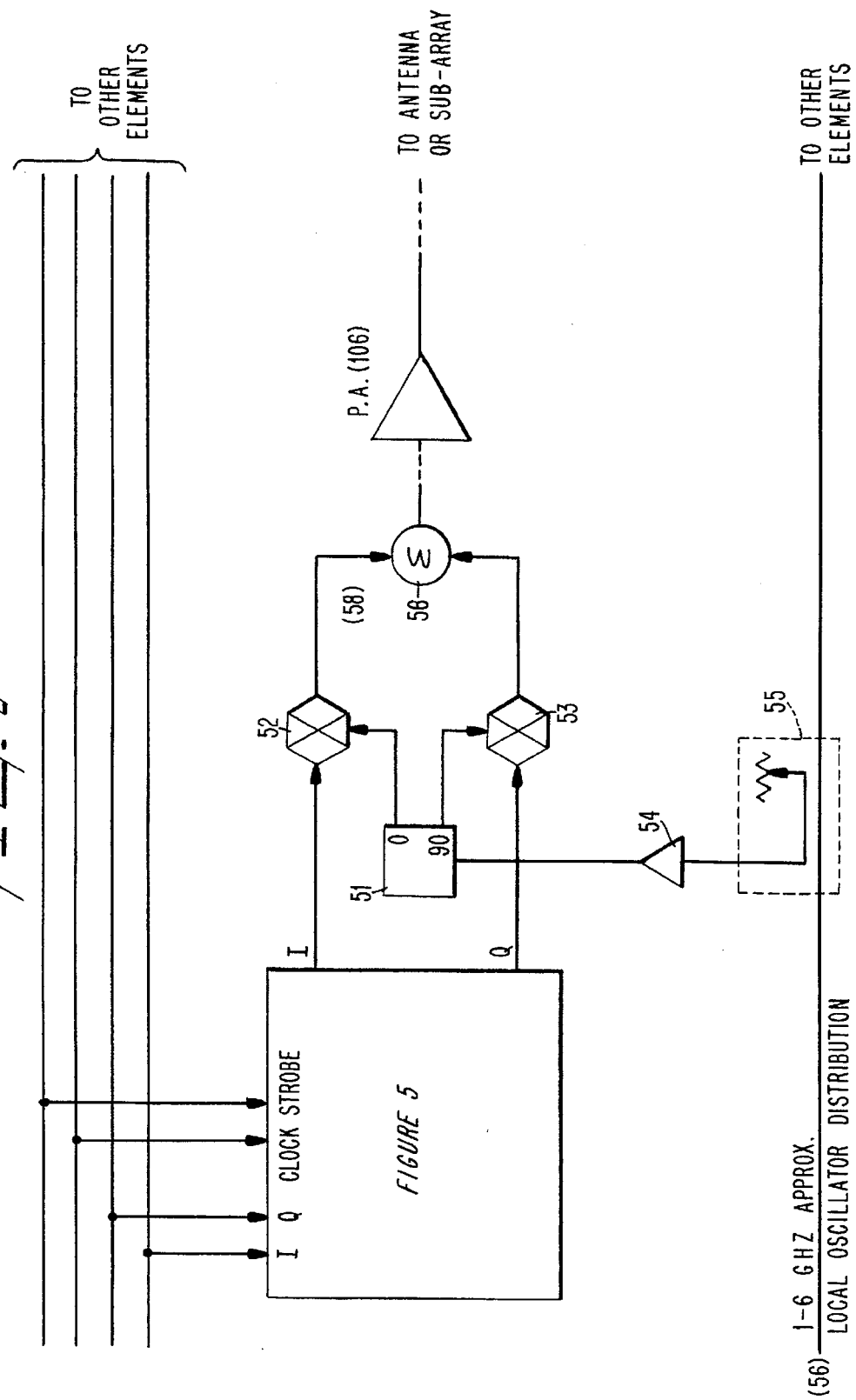

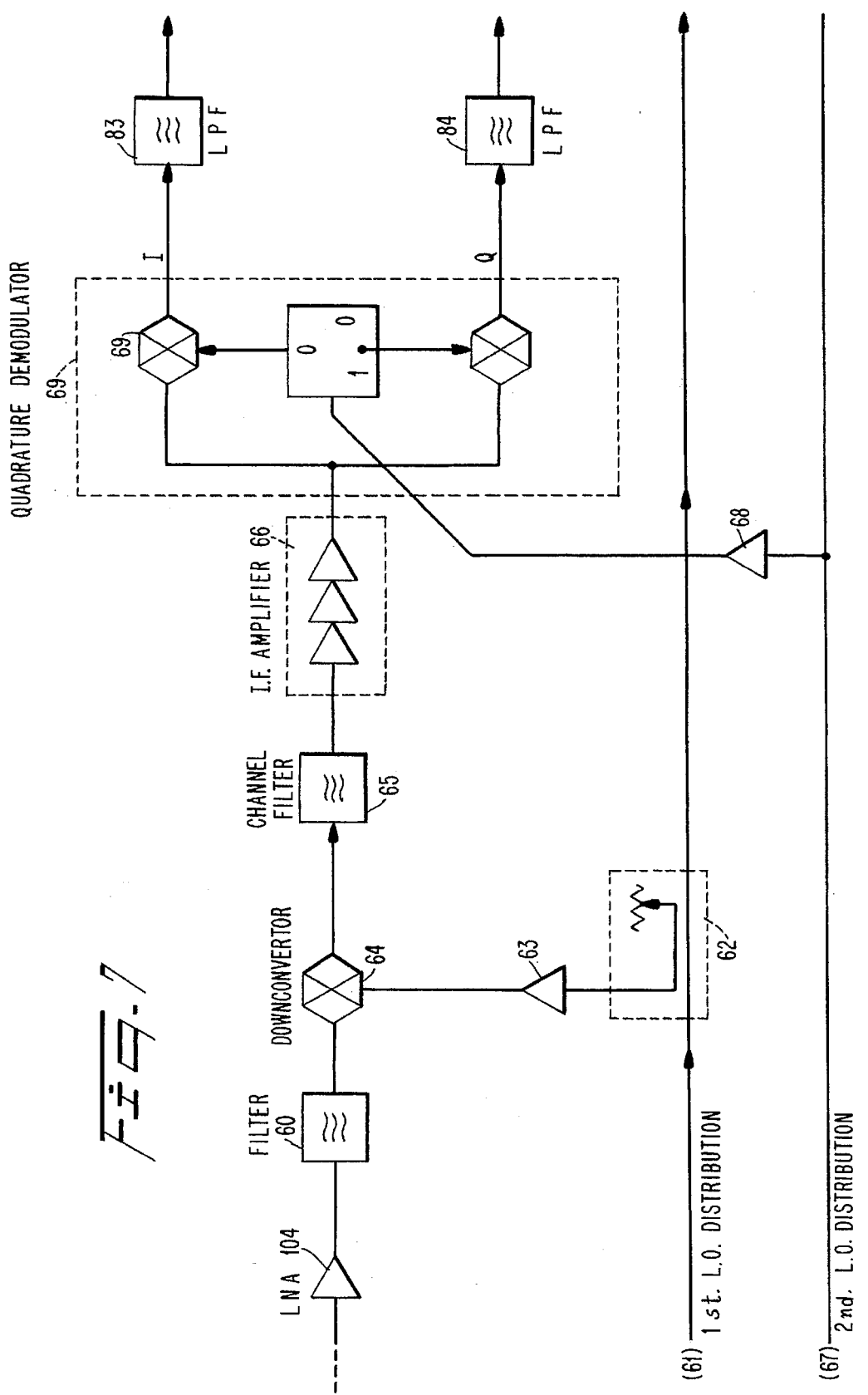

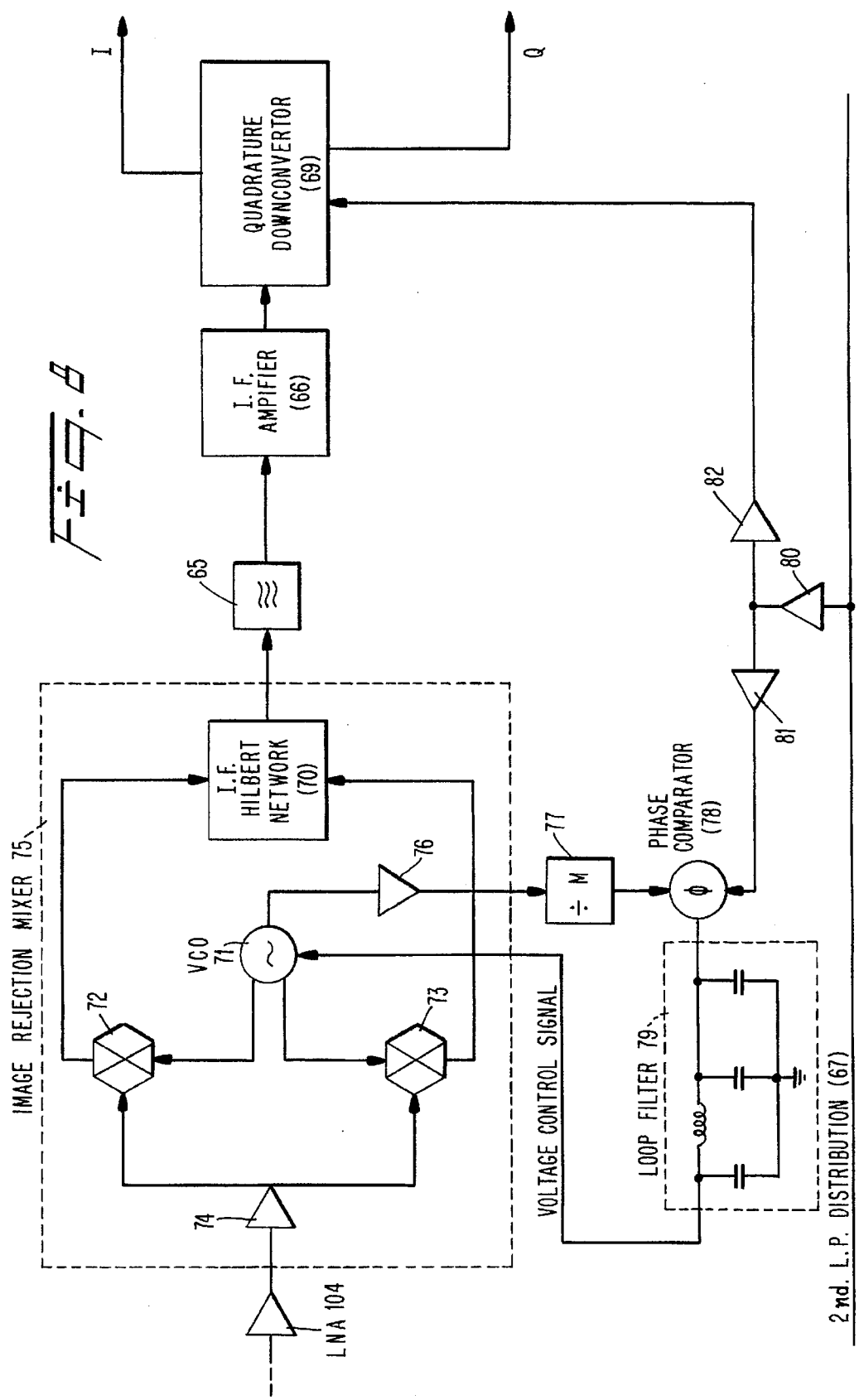

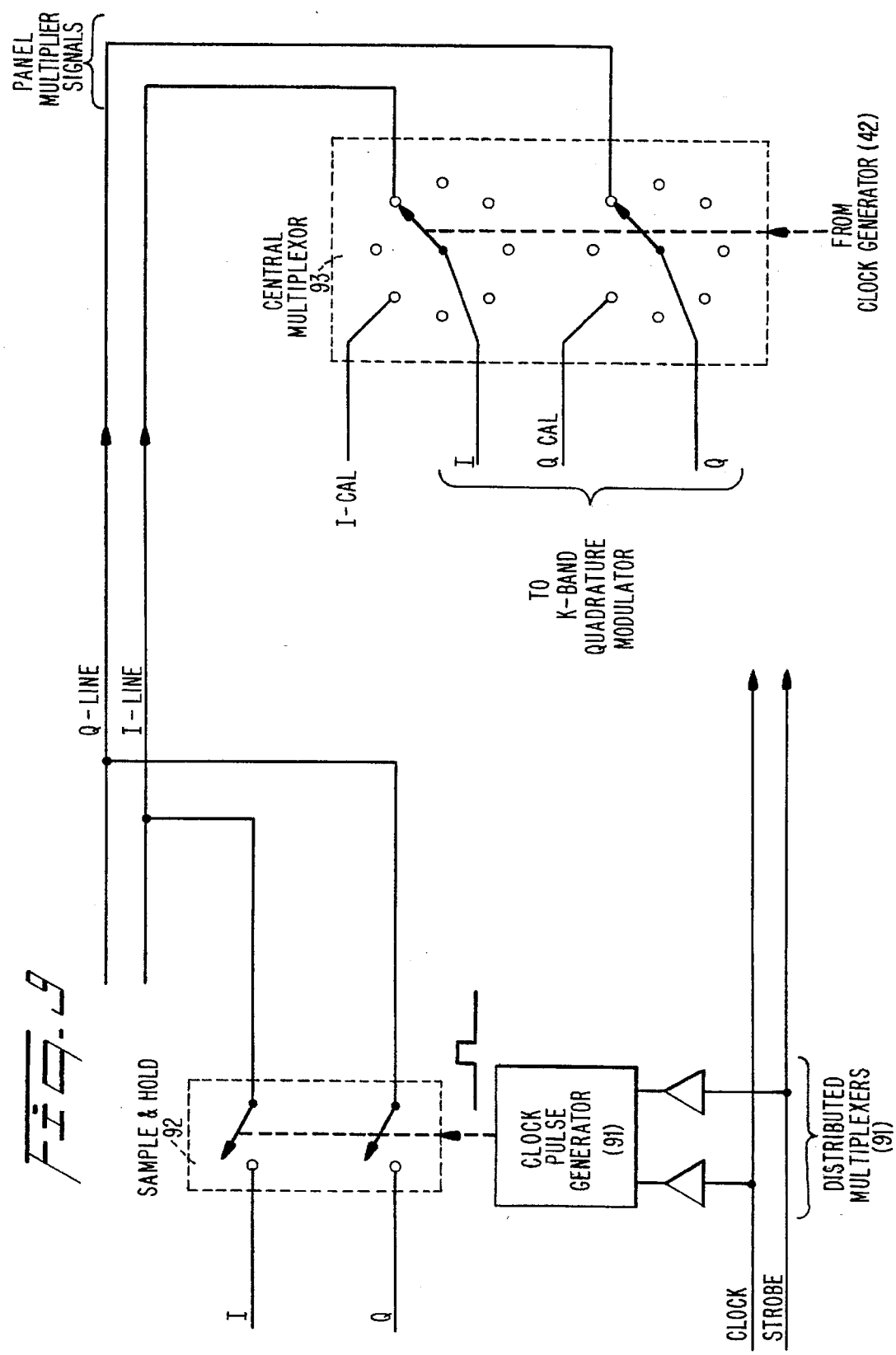

OPTICAL SATELLITE FEEDER LINKS

FIELD OF THE INVENTION

The present invention relates to a satellite communication system which uses optical feederlinks between a satellite and a ground station to provide power and information signals.

BACKGROUND OF THE DISCLOSURE

A cellular communication system can include a number of roaming, automobile-mounted or handheld telephone sets which are served by either fixed, ground-based stations or by orbiting satellites or by a combination of both. The capacity of such systems to serve a large number of subscribers depends on how much of the radio spectrum is allocated for the service and how efficiently the radio spectrum is used. Efficiency of spectral utilization is measured in units of simultaneous conversations (erlangs) per megahertz per square kilometer. In general, spectral efficiency can be improved more by finding ways to re-use the available bandwidth many times over than by attempting to pack more conversations into the same bandwidth, since narrowing the bandwidth generally results in the need to increase spatial separation between conversations thus negating the gain in capacity. Therefore, it is generally better to increase the bandwidth used for each conversation so that closer frequency re-use is possible.

One method to increase the capacity is to use a phased array communications satellite to relay signals from ground stations to a plurality of mobile stations. A ground-controlled orbiting phased array system is disclosed in U.S. patent application Ser. No. 08/179,953, filed Jan. 11, 1994, and U.S. patent application Ser. No. 08/179,947, filed Jan. 11, 1994, now U.S. Pat. No. 5,574,967, both of which are expressly incorporated herein by reference.

The prior art does not disclose the use of coherent time-multiplexed feeder links with distributed demultiplexing for reducing the cabling to a deployable phased array. Some prior art systems have separate coaxial cables or waveguides connecting each element of the array to a centrally located transponder. This arrangement was adequate for prior art systems in which the number of antenna elements or beams to be created was small, for example, 6, 19, or 37, but becomes impractical for the number of elements or beams envisioned in the present invention. One embodiment of the present invention eliminates the multiplicity of feeder cables reducing the weight of the system considerably.

Another problem with traditional satellite communication system is the limited amount of power in the satellite which is available for communication purposes. In order to combat this problem, traditional communication satellites employ solar panels to convert sunlight into energy. However, the power provided by the solar panels is sometimes not enough. Thus, there is a need for a method for providing additional power to a satellite.

SUMMARY OF THE DISCLOSURE

It is an object of the present invention to provide a communication system which uses feederlinks between ground-based base stations and a satellite to transmit information and power to the satellite. Furthermore, it is an object of the present invention to provide a practical system for communicating with high data rates and an inexpensive technique to power a satellite.

According to one embodiment of the present invention, a cellular communication system comprises a plurality of ground-based base stations, a plurality of mobile stations and at least one orbiting satellite for relaying information signals between the base stations and the mobile stations. A plurality of feederlinks are provided between the base stations and the satellite for transmitting information signals and power from the ground stations to the satellite.

According to another embodiment of the present invention, a method for transmitting information from ground-based base stations to an orbiting satellite on feederlinks in a cellular communication system is disclosed. Information signals intended for at least one mobile station are processed to form drive signals for satellite-formed phased array elements. The drive signals are then time multiplexed. Finally, the time multiplexed signals are amplitude or frequency-shift keyed onto laser beam feederlinks which are directed at the satellite.

BRIEF DESCRIPTION OF THE DRAWINGS

These and other features and advantages of the present invention will be readily apparent to one of ordinary skill in the art from the following written description, used in conjunction with the drawings, in which:

FIG. 6 illustrates quadrature modulation;

FIG. 7 illustrates receive processing elements according to the present invention;

FIG. 8 illustrates receive processing elements according to another embodiment of the present invention;

FIG. 9 illustrates receive processing and K-band transmit multiplexing elements according to one embodiment of the present invention;

FIG. 10 illustrates a satellite communication system according to one embodiment of the present invention;

DETAILED DESCRIPTION OF THE DISCLOSURE

Figure 1:
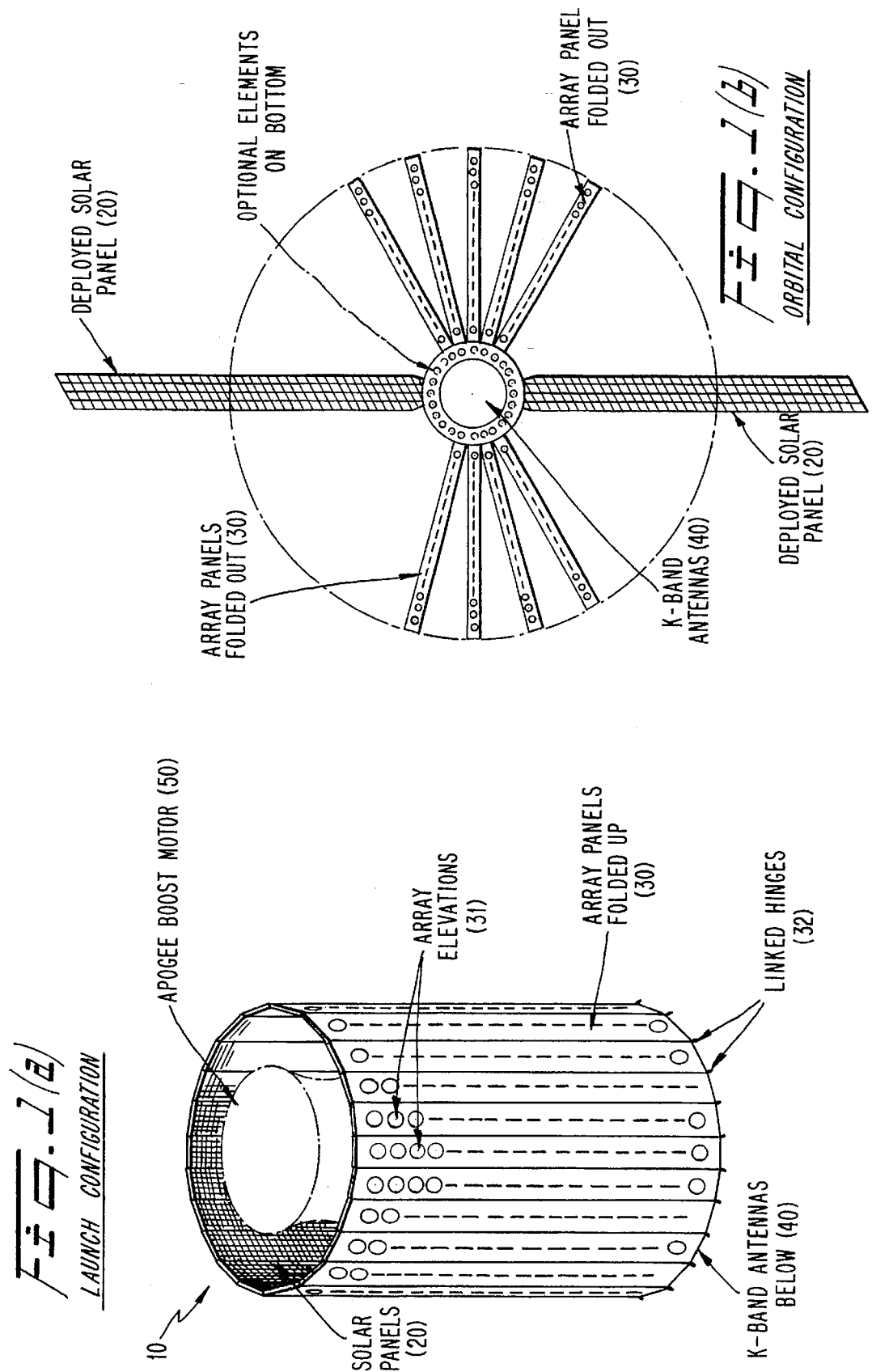
FIGS. 1(a)–1(b) illustrate the general construction of a satellite in accordance with the present invention.

FIG. 1(a) illustrates the general arrangement of a satellite according to the present invention. FIG. 1(a) shows the satellite 10 with a plurality of antenna array panels 30 and solar panels 20 which are folded in a launch configuration to form a more or less cylindrical shape more suited to be accommodated under a launch vehicle hiring for launch. The satellite can also include other usual subsystems such as an apogee boost motor 50 and other subsystems not shown in FIG. 1 such as batteries and power conditioning system, a reaction-wheel attitude control system with attitude sensors, a magnetic torquing system for periodically dumping wheel momentum, a heat-pipe thermal control system, telemetry, tracking and control systems, and the associated communications payload electronics which are well known in the art.

FIG. 1(b) illustrates the satellite in its usual configuration after the antenna panels and solar panels have been deployed in orbit. The K-band feeder link antennas 40 are located so as to point toward the earth while the spent apogee boost motor points away from the earth. Each antenna panel comprises a large number of antenna elements with associated active phased array modules which form active elements. The active elements can be transmit-only elements, receive-only elements or transmit/receive elements using either time-duplexing or frequency-duplexing. In the latter case, duplexing filters permit simultaneous transmission and reception.

Figure 2:
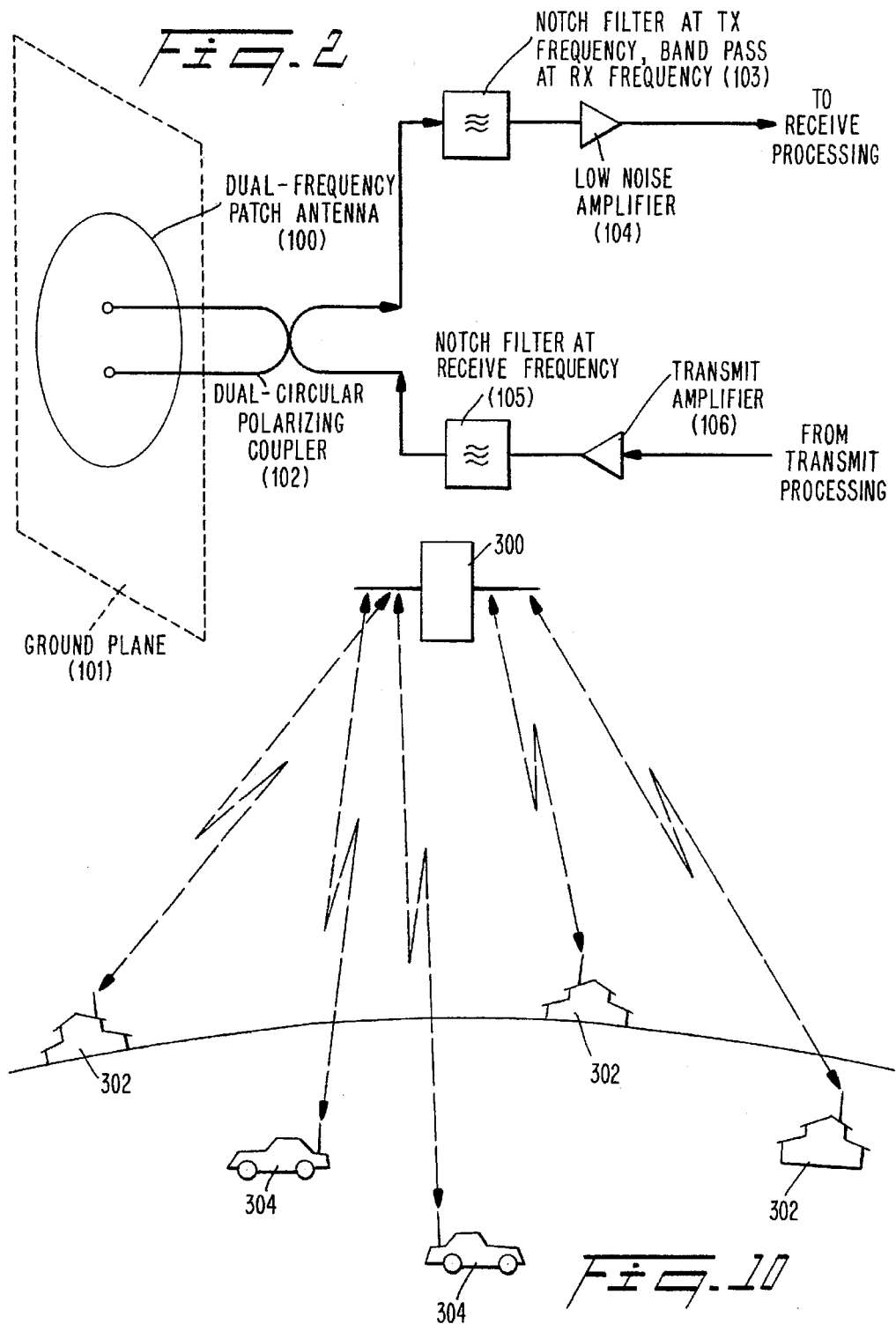
FIG. 2 illustrates an active antenna element for the transmitting and receiving using frequency duplex according to one embodiment of the present invention.

FIG. 2 illustrates a frequency-duplexing configuration according to one embodiment of the present invention. A patch antenna 100 is positioned over a conducting ground plane 101 to form an array element. The ground plane 101 can be, for instance, a printed circuit board with components mounted on the reverse side. The patch antenna 100 is fed at two points 90 degrees offset from center to form cross-linear polarizations. The cross-linear polarizations are converted to RHC and LHC circular polarization by use of a 90-degree, 3 dB coupler 102. One polarization is used for transmitting by connecting a transmit power amplifier 106 through a filter 105 to one input of the coupler 102 and the other coupler port is used for receiving by connecting the port through a filter 103 to a low-noise amplifier 104. The use of opposite polarization for transmitting and receiving gives perhaps 20 dB of isolation between the power amplifier 105, which may be transmitting at 1 watt rms, and the low-noise amplifier 104 which may be receiving at $10^{-16}$ watts. Because of this vast disparity in power levels, more isolation than the 20 dB of isolation that the coupler provides is needed. The filter 105 presents a block to potentially interfering components and broad-band noise at the receive frequency amplified by the power amplifier 106. However, the filter 105 passes the wanted transmit frequencies to the filter 103 which presents a block to residual transmit frequency energy reaching low noise amplifier 104 that might be strong enough to saturate it, while passing the wanted receive frequencies. With sufficient transmit/receive frequency spacing (duplex spacing), such filters as well as the coupler 102 can be cheaply printed on printed circuit panel 101 on which power amplifier 106 and low-noise amplifier elements 104 are also mounted. In some cases, each patch antenna 100 may not always have an associated power amplifier and low-noise amplifier. A number of patch antennas may first have their signal connections joined together to form a "sub-array" before being connected to a panel amplifier and low noise amplifier for that sub-array.

The objective in designing such a sub-array is that the composite radiation diagram formed by coupling its individual elements should cover the entire region over which communications is to be provided. If the radiation diagram is too wide, the number of sub-arrays and consequently associate power amplifiers and low-noise amplifiers will be unnecessarily great, and since each has to receive a signal from the ground stations over the K-band feeder link, the amount of feeder link bandwidth used will be greater than necessary. On the other hand, if the sub-array pattern is too narrow, there will be a loss of gain at the edges of the coverage region. The coverage region may, for example, be taken to be the area of the earth over which the satellite is instantaneously visible at 20 degrees above the horizon or more. Such a loss of gain at the edge of coverage may be minimized by shaping the radiation pattern of each element to give more gain at the edge of coverage, where earth-bound mobile stations are at the greatest slant range, and less gain in the middle of coverage where the satellite is directly overhead and the slant range to the mobile stations is a minimum. The gain at the edge of coverage may also be improved by deliberately using sub-arrays of somewhat wider beamwidth than earth coverage and using more sub-arrays to form the desired beams. This requires more K-band bandwidth, and a factor of two is advantageous if available. Other inventive aspects of U.S. patent application Ser. No. 08/179,947, which has been incorporated herein by reference, may then be employed, such as the use of efficient class-C power amplifiers for transmitting multiple signals, with dissipation of unwanted intermodulation components thereby produced in directions that do not intercept the earth.

Figure 3:
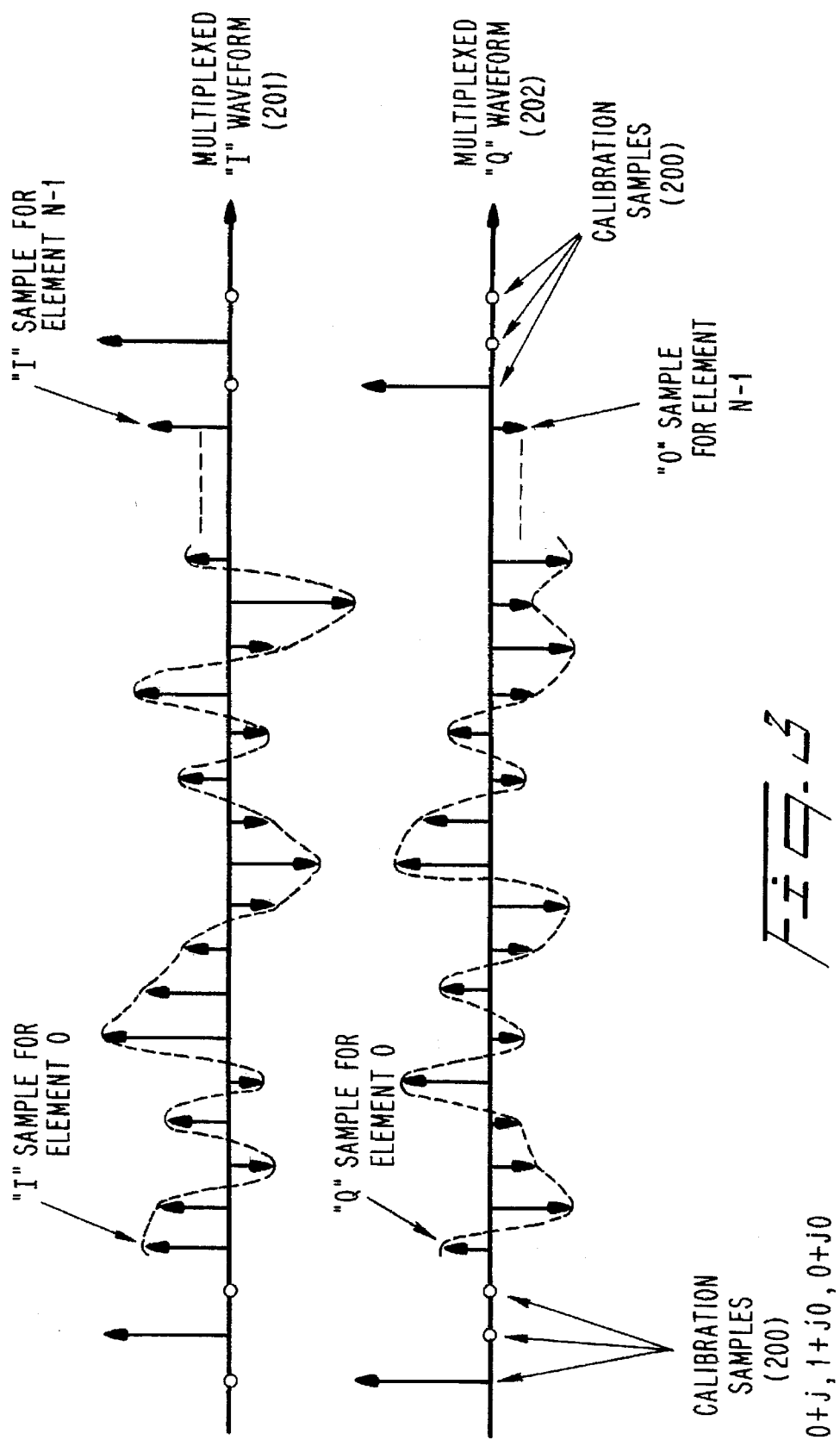
FIG. 3 illustrates a coherent time-multiplex Feeder Link according to one embodiment of the present invention.

FIG. 3 illustrates the time-multiplex format used on the K-band feeder link. For the satellite transmit direction, a ground station signal processor calculates complex (I+jQ) signal samples for each transmit array element which represent a composite signal comprising weighted sums of signals destined for a plurality of mobile stations. The composite signal of each element is calculated so that the combined effect of transmitting them from corresponding satellite array elements will be such that each signal intended for each mobile station will be transmitted in a desired direction. The matrix math operations for generating these signals in a digital signal processor are disclosed in U.S. patent application Ser. No. 08/179,953, which has been incorporated herein by reference.

The signal samples for each element are time-multiplexed into a time-multiplexed 'I' signal 201 representing the real parts of sequential elements and into a time-multiplexed 'Q' signal 202 representing the imaginary parts of successive elements. Known calibration samples 200 may be included in the multiplex format to assist with synchronization and frequency correction at the receiving demultiplexer. The I-multiplexed signal is modulated onto a K-band carrier cosine component while the Q-multiplexed signal is modulated onto a sine carrierwave. This may be performed in a known manner by a quadrature modulator. The modulation can, if desired, first be impressed on to a lower intermediate frequency carrier which is then converted to the K-band.

Figure 4:
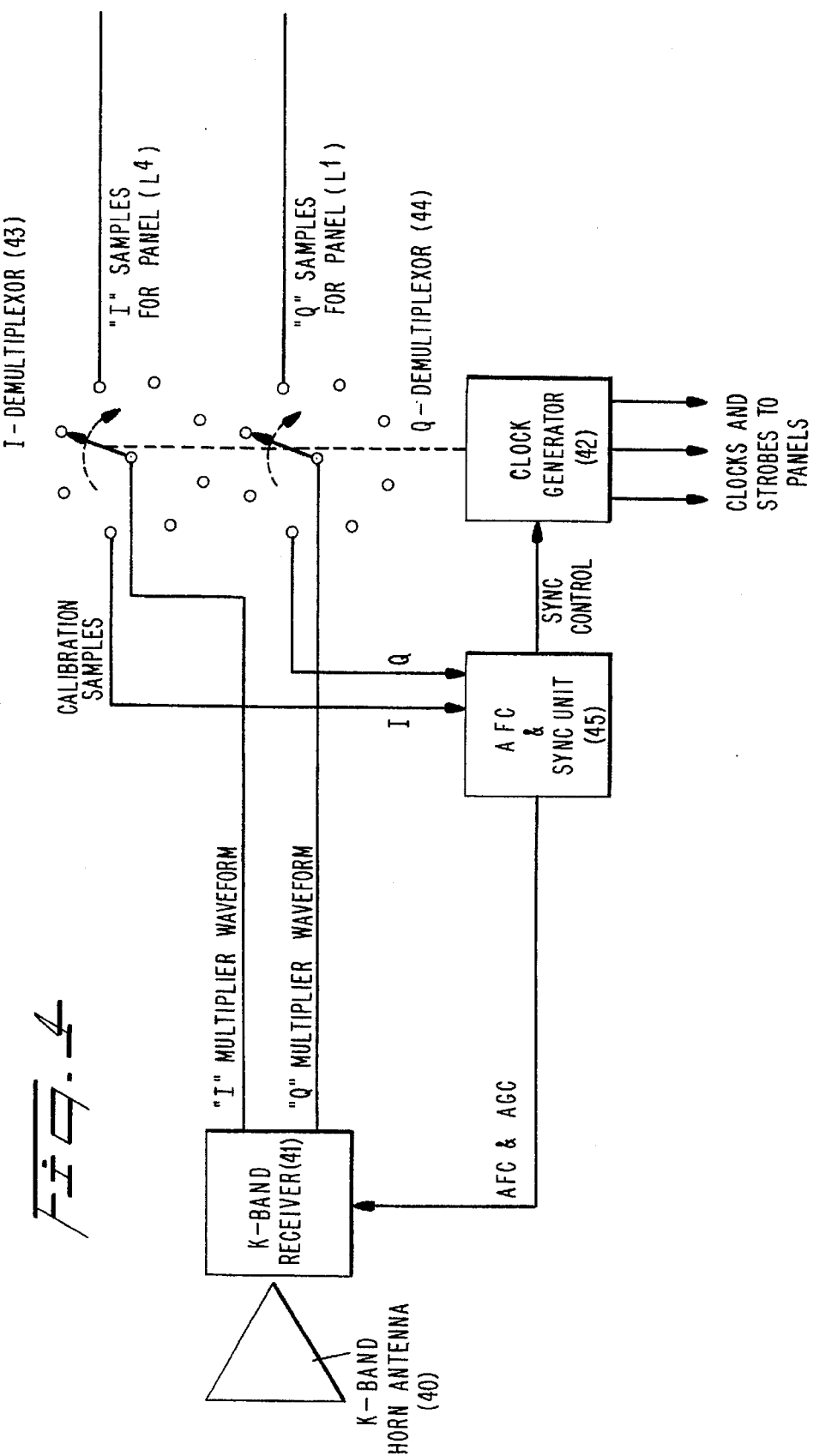
FIG. 4 illustrates a first stage of a receiving demultiplexer according to the present invention.

FIG. 4 illustrates the receiving demultiplexer at the satellite according to one embodiment of the present invention. Signals are received from a ground station on the K-band using the K-band antenna 40. The received signals are amplified, filtered and downconverted using known superheterodyne receiver 41 principles and finally converted to the complex I,Q baseband using a quadrature demodulator to yield I and Q multiplexed waveforms. These waveforms are sampled by an I-demultiplexer 43 and a Q-demultiplexer 44 to separate waveform samples intended for different array panels. To facilitate this, the order of multiplexing should preferably be Calibration sample 0
Sample for element 0 of panel 0
Sample for element 0 of panel 1
Sample for element 0 of panel 2
Sample for element 0 of panel 3
Sample for element 0 of panel 4
Calibration sample 1
Sample for element 1 of panel 0
Sample for element 1 of panel 1
Sample for element 1 of panel 2
Sample for element 1 of panel 3

Sample for element 1 of panel 4
etc.

Thus the demultiplexer separates Calibration sample 0 onto a first output; a sample for element 0 of panel 0 onto a second output; a sample for element 0 of panel 1 onto a third output and so-on, and then returns to separate calibration sample 1 onto said first output again; a sample for element 1 of panel 0 on to said second output, and so-on. Thus from output 1, a stream of successive calibration samples 0,1,2, . . . 0,1,2 . . . is produced and sent to synchronization and frequency correction unit 45 while from output 2, a stream of samples for successive elements 0,1,2 . . . of panel 0 is produced. From output 3, a stream of samples for successive elements 0,1,2, . . . of panel 1 is produced and so forth.

The synchronization and frequency correction unit 45 is programmed to expect the a-priori known sequence of calibration samples and controls the timing of the clock generator 42 in order to synchronize the demultiplexers 43 and 44 until the expected stream of calibration samples is received. As an example, suppose the satellite comprises 31 deployable phased array panels and there is one calibration sample dispersed in a total multiplex cycle of 32. The number 32 is preferably a power of 2 because very high-speed multiplexers or demultiplexers can more easily be constructed as a binary tree of bipolar transistor switches, wherein pairs of signals are multiplexed in a set of first stage multiplexers, pairs of the pairs are further multiplexed in a second stage set of higher speed multiplexers and so on. Each of the 31 samples per cycle of 32 is destined for a particular panel and may consist of a further multiplex or sub-multiplex of samples destined for each element of the panel. For example, there may be 16 elements per panel and 31 panels. As a result, the total number of elements in the array would then be 31×16=496. The total number of elements in the array may be changed by varying the number of calibration samples and panels multiplexed in the first stage of multiplexing or by varying the number of elements per panel. In the latter case, it is not important to have a multiplex cycle of a power of two, since the lower speed sub-multiplexers are easier to construct with any number of inputs.

Supposing now that each element radiates a composite signal with approximately a 1 MHz bandwidth, the number of complex samples per second per element required to satisfy the Nyquist sampling theorem is 1 million samples. The total number of samples per second over the K-band link would then be 512 million, comprising 32 sub-multiplex streams of 16 million samples/sec of which 31 of the 16-million sample/sec streams are for respective array panels and one 16 million sample/sec stream consists of calibration samples. The 16-megasample/sec calibration stream can consist of known signal levels such as +1, −1 or 0 and can form a 16 Megabit code on the I and Q streams if desired. This is more than sufficient information with which to acquire and maintain synchronization as well as to send housekeeping information or commands to and from the satellite.

Calibration samples comprised of an I sample and a Q sample together form a complex sample. A transmitted complex sample of 1+jQ may be received as $A \cdot \cos(\theta) + jA \cdot \sin(\theta)$, where A is the received amplitude after attenuation over the propagation path and amplification in the receiver, and $\theta$ is the phase shift introduced on the path. The synchronization and frequency correction unit 45 can compute the sum of the squares of such I and Q calibration samples to yield $A^2$, which can be used to adjust the gain of the receiver 41 until the output calibration samples from the receiver 41 and the demultiplexers 43 and 44 are of a desired amplitude. This will ensure that array signal samples are also of a desired magnitude.

The absolute phase shift $\theta$ is of no consequence since only the relative phases of array signals are important. However, the rate of change of $\theta$ represents a frequency error, and the synchronization and frequency correction unit 45 can compute the rate of change of phase by combining successive I and Q calibration samples of the same type and $I(i-1), Q(i-1)$ and $I(i), Q(i)$ using the formula $$Q(i) \cdot I(i-1) - I(i) \cdot Q(i-1)$$

This formula gives a measure of how much the phase has rotated between successive calibration samples of the same type, and thus a measure of the frequency error. This can be used to correct the local oscillators used in the K-band receiver 41 until the frequency error is within acceptable limits. The number of samples/sec of frequency error which can be computed, as many as 16 million in the above example, is more than sufficient to ensure that a fast, accurate automatic frequency control feedback loop can be constructed. An element of the absolute phase $\theta$ can also be included in the automatic frequency control feedback, to form a phase lock loop as well as a frequency lock loop. This can be done by adding an element of the Q sample $A \cdot \sin(\theta)$ into the feedback loop, which becomes controlled to zero, thus controlling $\theta$ to the target value zero.

The clock generator 42, when synchronized under control of the synchronization unit 45 to separate out the expected calibration sample pattern, also generates output clock pulses and framing strobes for distribution to the array panels along with the respective separated signal samples for each panel.

Figure 5:
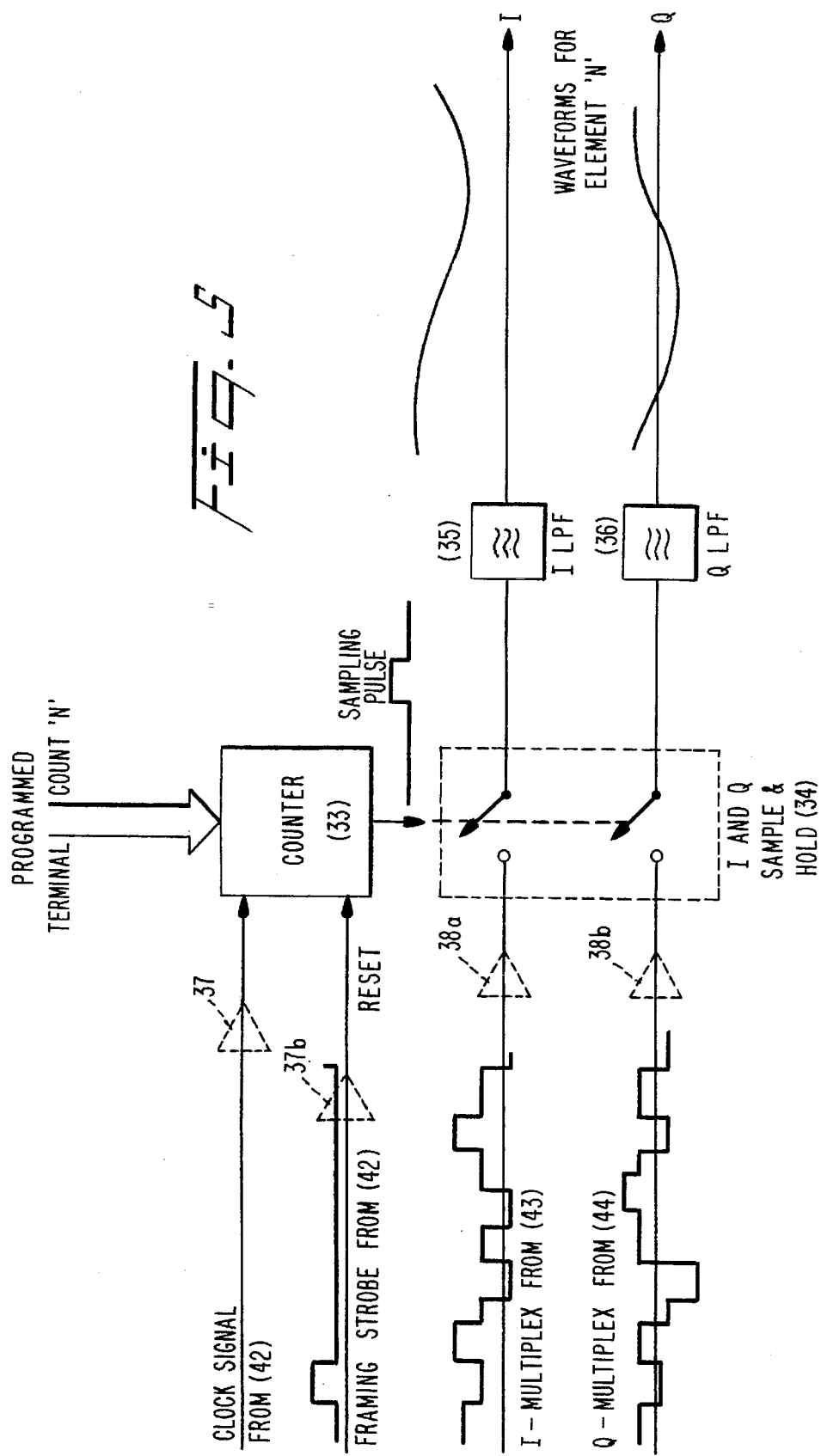
FIG. 5 illustrates a second stage of a receiving demultiplexer according to the present invention.

FIG. 5 illustrates how such clocks and strobes are used at each element of a particular panel. The clock signal from the unit 42 is buffered by a buffer amplifier 37a and used to drive a counter 33. The strobe signal from the unit 42 is buffered in a buffer amplifier 37b and used to reset the counter. The strobe signal can, for example, correspond to a time when a calibration sample is being separated by the demultiplexers 43 and 44 and no array element sample is being separated, wherein the strobe marks the start of the array sample separation from the time-multiplex format. The counter 33 is programmed with the number of clock pulses 'N' after the strobe at which it shall generate a sampling pulse for sample and hold circuits 34. This separates out the signal for the element N of the array panel in question from the I and Q multiplex streams. The buffer amplifiers 38a, 38b prevent glitches from the sampling switches 34 from being feedback to the I and Q multiplex line thus avoiding potential interference on the line, which is common to all elements of the panel. The separated I and Q samples for element 'N' are then converted to continuous modulating waveforms using low-pass filters 35 and 36 which have cutoff frequencies just less than half the sub-multiplexed sample rate (1 Megasample/sec in the above example).

FIG. 6 illustrates how the continuous I and Q waveforms created by the circuit illustrated in FIG. 5 are used to quadrature modulate an L-band carrier using a quadrature modulator. The desired L-band center frequency is determined by a local oscillator signal 56 which is distributed to all elements along a stripline track on a printed circuit array panel, for example. A portion of the local oscillator signal is sampled off line 56 using a directional coupler 55 which can also be printed on the panel. After buffering in a buffer amplifier 54, the signal is split into components differing in phase by 90 degrees using a Hilbert network or phase shifter 51. The components drive respective I and Q balanced modulators which impress I and Q modulation on respective I and Q carrier waves. The modulated I and Q carrier waves are then summed at summing junction 58 to produce a signal to drive a power amplifier 106.

No steps need be taken to control the relative phase of the local oscillator 56 distributed to different elements, since any phase differences are fixed and stable in the medium term and as such can be compensated during generation of the elementary I and Q samples at the ground station. U.S. patent application Ser. No. 08/179,953, which has been incorporated herein by reference discloses the use of the mobile terminals to determine beamforming errors caused by imperfect compensation of such factors, periodically transmitting such measurements back through the satellite to the ground station on a return link.

FIG. 7 illustrates part of the receive signal processing network according to one embodiment of the present invention. The signal received at an array element or sub-array is amplified by the low-noise amplifier 104, and then after image rejection in a filter 64, the signal is downconverted in a mixer 64 by superheterodyning with a first local oscillator signal 61. The resulting signal is distributed to all elements along a printed circuit track, and each element samples a portion of the signal using a directional coupler 62 and a buffer amplifier 63. The received signal, having been mixed down to a suitable intermediate frequency, is filtered using a bandpass filter 65 to impose the desired total system bandwidth (1 MHz in the above example). The filtered signal is then further amplified using an intermediate frequency amplifier 66 to raise the signal to a convenient level. The amplified intermediate frequency signal is then quadrature downconverted to the complex (I,Q) baseband using a quadrature demodulator 69. A second Local Oscillator defines the center frequency of the bandwidth which is converted to baseband, and is distributed to all elements.

Certain modifications can be made to the circuit illustrated in FIG. 8 to reduce the number of distributed local oscillators and to minimize the number of circuit components not suitable for integration into a silicon chip. For example, instead of using the image rejection filter 60, an image rejection mixer configuration 75 can be used, comprising a splitting amplifier 74, mixers 72 and 73 which are driven by quadrature local oscillator signals from quadrature VCO 71 and intermediate frequency Hilbert combining network 70.

The number of local oscillator signals to be distributed can be reduced if the first and second local oscillator frequencies are chosen to have a simple relation between them, for example 32:1. The first local oscillator frequency is then buffered by an amplifier 76 and fed to a digital divider 77 where it is divided by 32 for comparison in a phase comparator 78 with the distributed second local oscillator signal sampled off the line 67 by buffers 80 and 81. The error signal is then filtered using a loop filter 79 and applied to a voltage control input of a quadrature voltage controlled oscillator 71 to control its frequency and phase. Such circuits have also been reduced to practice and may be integrated into a single silicon chip comprising all of the blocks 75, 77, 78, 80, 81, 82, 66 and 69. Only non-integrable filters such as 103, 65 and 79 remain outside the chip, which occupies only a few square millimeters of silicon. Furthermore, the same technique can be used to locally create the transmit local oscillator signal 56, so that a single reference frequency only need be distributed to the elements along the array panels.

FIG. 9 illustrates another receive processing circuit to multiplex the signals from each element of a panel into panel-multiplex signals, using distributed multiplexers 91 and 92 and finally the supermultiplexing of all panel signals using central multiplexer 93 which also incorporates calibration signals for similar use at the ground station to that described for the satellite, namely to effect synchronization acquisition, maintenance, automatic gain control and automatic frequency control. The distributed multiplexers 92 and 91 can be incorporated into the same silicon chip envisaged to realize the circuit of FIG. 8.

It is evident that the number of lines for distributing clocks and strobes is minimized if the clock and strobe for the receive processing can be the same as that used for transmit, and this is the preferred solution.

FIG. 10 illustrates a satellite communication system according to one embodiment of the present invention. A communications transponder carried by an orbiting satellite 300 relays signals sent from one or more central ground base stations 302 to a plurality of mobile stations or terminals 304, and vice-versa. The links 306 from the ground-based base stations to the satellite carry a wide-band time multiplex of complex drive signals for the phased array antenna as described above, carried on the satellite. The satellite then forms beams for relaying the signals to the mobile stations. The links between the base stations and the satellite are called feederlinks.

The feederlinks can, according to one embodiment of the present invention, transport power as well as information signals from the base stations to the satellite. The power is transported to the satellite by using a large number of lower power feederlinks transmitted by a plurality of base stations as will be described below. The site diversity of base stations avoids the possibility of a dangerously high energy density from appearing at any point in commercial air space. In addition, the site diversity is also helpful in overcoming signal attenuation at high microwave frequencies due to adverse whether conditions.

Figure 11:
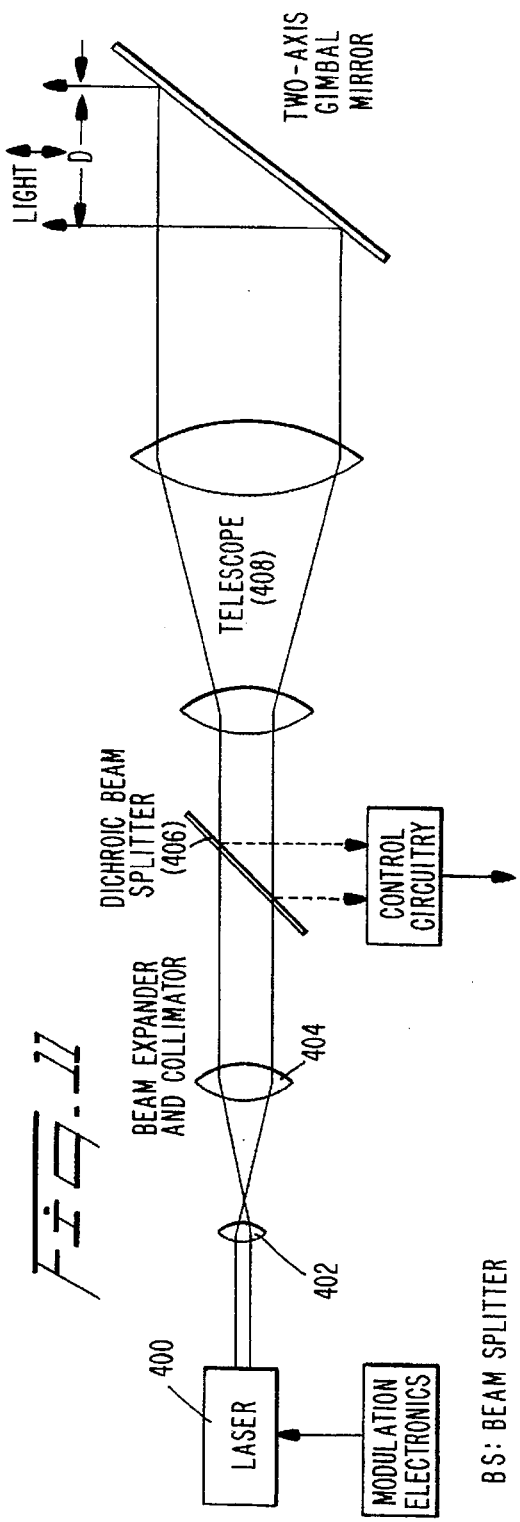
FIG. 11 illustrates a telescoping architecture according to one embodiment of the present invention.

An ordinary source of light radiates in all directions. However, the output from a laser source may be very close to an ideal uniform plane wave whose divergence is primarily due to diffraction effects. For a laser emitting light at a wavelength $\lambda$, with an effective radiating aperture D, the angular divergence $\Theta_d$ is given by $$\Theta_d = \beta \lambda / D$$

where $\beta$ is an efficiency factor. A telescoping arrangement can be used to reduce angular divergence by increasing the radiating aperture. FIG. 11 illustrates a typical optical design telescoping architecture which is simple to implement using existing technology. Light from a laser 400 is expanded in a beam expander 402 and collimated using a collimator 404. After the light has been expanded, the beam passes through a dichroic beam splitter 406 and into a telescope optical system 408 which magnifies the beam diameter to a value D. Typical values for a practical free-space laser communication system are D=40 cm and a ten times magnification. A two-axis gimbal mirror is used for coarse beam alignment between the transmitter and the common remote-receiving aperture. An additional advantage of such a system is that the solar cells can be kept fixed which reduces the mechanical complexity on the satellite.

Several telescope arrangements will now be described for a low orbit satellite at an altitude of 10355 km. If a ruby laser is used with $\lambda$=0.694 micrometers and a telescope diameter of one meter, the laser beam diameter at the satellite is approximately 13.5 meters. For such a laser, the average transmit power is 1 Watt in the pulsed mode, while a peak power of up to 10 MW can be achieved if desired. In another example a Nd:YAG CW laser can be used where $\lambda=1064$ nanometers. In this case, the existing lasers have an average power of 200 Watts. With a telescope diameter of 1 meter, the beam diameter at the satellite is 20.7 meters.

Figure 12:
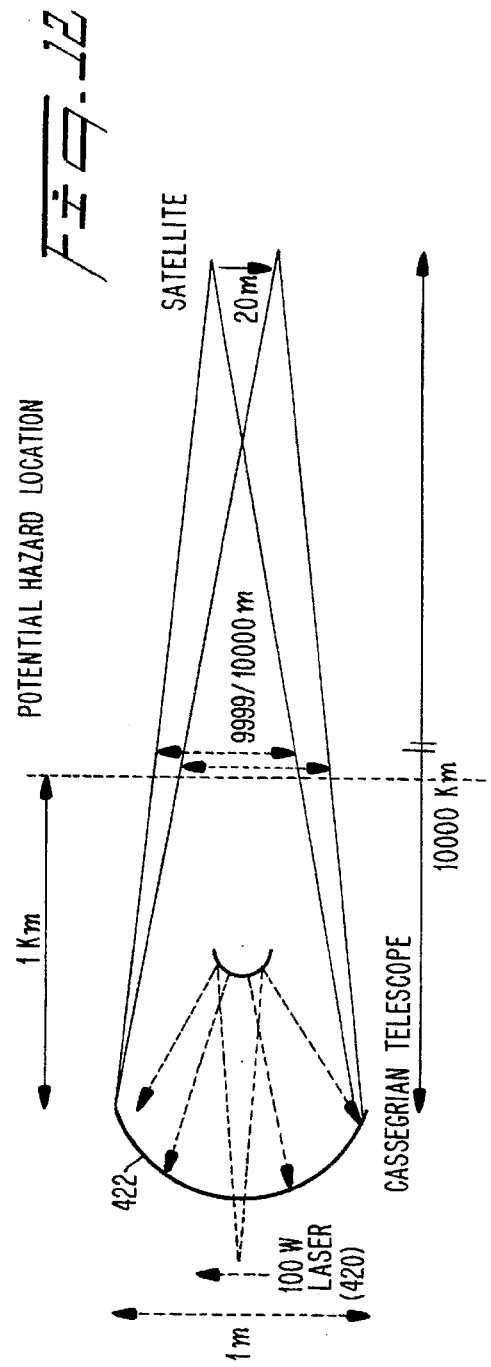
FIG. 12 illustrates another telescoping architecture according to one embodiment of the present invention.

FIG. 12 illustrates an alternative telescope arrangement which uses a telescoping mirror rather than the telescoping lens arrangement illustrated in FIG. 11. In this arrangement the laser 420 is pointed at a curved mirror 422 which reflects the light in a beam to the satellite. If the mirror 422 has a height of 1 meter, the beam diameter at the satellite will be equal to approximately 20 meters.

For a high capacity satellite, a laser optical feederlink can be used according to one embodiment of the present invention. Optical signals can be severely attenuated when traveling through clouds. This problem is avoided in the present invention by providing multiple spaced sites sufficient to ensure that at least some have a clear view of the orbiting satellite. In order to transport power to the satellite using laser beams without endangering aircraft, multiple low-power lasers are beamed from diverse sites wherein their beams are harmonized only at the latitude of the satellite so that the energy density remains below safe limits at all other locations. In addition, the number of laser sites within the horizon of aircraft flying at 60,000 feet may be restricted so that they can not be harmonized to become a potentially dangerous directed energy force within the airspace.

In order to transport information to the satellite, a ground-based beam forming computer processes information signals intended for each user terminal to form drive signals for the satellite born phased array elements. Each drive signal comprises an In-phase and a Quadrature component forming a complex signal I+jQ. The I,Q signals are time multiplexed in a sequence $I_1, Q_1, I_2, Q_2, \ldots$ in a TDM frame which is then amplitude or frequency shift-keyed onto the laser beam. For instance, one method for transporting information is as follows. To transmit bit 0 on the I channel, all lasers turn their power "off". To transmit bit 1, the lasers turn on. Information is transmitted in a similar manner on the Q channel. The receiver is a noncoherent detector. Such a detector counts the number of photons received and outputs the bit 0 if the number of photons is very small. Usually, the system designer chooses a threshold $\Lambda$. If $\alpha$ is the photon count, then the receiver performs the following $$\text{output} = \begin{cases} 0 \text{ if } \alpha \leq \Lambda \\ 1 \text{ if } \alpha \leq \Lambda \end{cases}$$

Now, $\Lambda$ can be chosen to minimize the probability of error. In addition, the I,Q signals could be modulated in a conventional fashion onto a microwave beam as disclosed in U.S. patent application Ser. No. 08/225,399, which is incorporated herein by reference.

In the downlink direction, the feederlink can also employ a satellite-borne modulated laser. The laser may be steered to the point to the central ground station by an accurate mechanism controlled with the aid of an attitude control system. At least two other lasers can be steered to point to alternate central stations to provide site diversity against weather attenuation. In addition, microwave beams can alternately be used an may be spot beams or global coverage beams.

A beacon signal can be used on the downlink to steer the laser such that it points at a central ground station. This beacon signal relays spatial acquisition and tracking data on an optical wavelength different from the transmit optical wavelength, for example 830 nm wavelength. In this case, the transmitter's dichroic beam splitter directs the incoming beacon signal to a set of beam splitters and focusing lenses that are coupled independently to a charged coupled device (CCD) detector array and a photo diode. The CCD output indicates the degree of course alignments while the adjustments for fine alignment are then performed using the gimball mirror. The photo diode generates beacon data from the receiver.

Many detailed variations in the present invention can be devised by a person skilled in the art with the help of material disclosed in U.S. patent application Ser. No. 08/179,953, which has been incorporated herein. All such variations are deemed to lie within the scope and spirit of the invention as described by the following claims.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A cellular communication system, comprising:
   a plurality of ground-based base stations;
   a plurality of mobile stations;
   at least one orbiting satellite for relaying information signals between said base stations and said mobile stations; and
   a plurality of feederlinks between said base stations and said satellites for simultaneously transmitting said information signals and power from the ground stations to said satellite.

2. A cellular communication system according to claim 1, wherein said feederlinks are optical feederlinks.

3. A cellular communication system according to claim 1, wherein said feederlinks are laser beams.

4. A cellular communication system according to claim 3, wherein said laser beams are low power laser beams.

5. A cellular communication system according to claim 3, wherein the plurality of laser beams are harmonized at the altitude of the satellite.

6. A cellular communication system according to claim 1, wherein said base stations are scattered.

7. A cellular communication system according to claim 1, wherein said satellite uses a steerable laser for a down-feederlink to a central ground-based base station.

8. A cellular communication system according to claim 7, wherein said satellite further uses a plurality of addition laser for down-feederlinks to alternative ground-based base stations.

9. A cellular communication system according to claim 1, wherein said satellite uses microwave beams to form a down-feederlink to a central ground-based base station.

10. A cellular communication system according to claim 1, wherein said satellite uses a plurality of microwave beams to form down-feederlinks to said plurality of base stations.

11. A method for transmitting information from ground-based base stations to an orbiting satellite in a cellular communication system, comprising the steps of:
    processing information signals intended for at least one mobile station to form drive signals for satellite-borne phased array elements;
    time multiplexing said drive signals;
    amplitude or frequency-shift keying said time multiplexed drive signals onto laser beam feederlink signals which are transmitted to said satellite;

demodulating said feederlink signals received at said satellite to reconstruct said time multiplexed drive signals; and demultiplexing said drive signals at said satellite using a plurality of distributed demultiplexing circuits.

12. A method for transmitting information from ground-based base stations to an orbiting satellite in a cellular communication system, comprising the steps of:

processing information signals intended for at least one mobile station to form drive signals for satellite-borne phased array elements;

time multiplexing said drive signals;

modulating said time multiplexed drive signals onto microwave feederlink signals which are transmitted to said satellite;

demodulating said feederlink signals received at said satellite to reconstruct said time multiplexed drive signals; and demultiplexing said drive signals at said satellite using a plurality of distributed demultiplexing circuits.

* * * * *